June 10, 1952 O. L. MacSORLEY 2,600,120

VOLTAGE SELECTIVE AMPLIFIER

Filed Jan. 18, 1949

INVENTOR
Olin L. MacSorley
BY Conder C. Henry
ATTORNEY

Patented June 10, 1952 2,600,120

UNITED STATES PATENT OFFICE 2,600,120

VOLTAGE SELECTIVE AMPLIFIER

Olin L. MacSorley, Collingswood, N. J., assignor to Radio Corporation of America, a corporation of Delaware Application January 18, 1949, Serial No. 71,496

1 Claim. (Cl. 179—171)

This invention relates to amplifiers and more specifically it relates to means for selecting voltages of predetermined amplitudes.

Many circuits, which are operated by signals derived from amplitude selection of incoming voltages, require pulses of a particular polarity. To accomplish this requirement it is necessary to provide at times a surplus amplifier stage to reverse polarity. Also in circuits of the prior art, not enough gain can be realized in operation of a single stage to warrant practical application of a single stage selector amplifier circuit. It is accordingly the purpose of my invention to correct these inadequacies in a novel manner and to provide an economical means for obtaining amplification of selected voltages.

An object of my invention is to provide an amplifier stage which will have frequency response great enough to amplify a square wave input voltage without objectionable distortion.

One object of my invention is to provide a voltage selector stage in which output and input signals are of the same polarity.

Another object is to supply a voltage selector stage having a large signal output.

A still further object of my invention is to furnish economical and practical means whereby selection and amplification of an input voltage may be attained.

Other objects and features of my invention will be set forth in the ensuing discussion.

Briefly one specific embodiment of my invention which I have used for purposes of illustration comprises a resistance coupled amplifier circuit in which a regenerative feed back voltage is provided and in which a bias voltage is used to reject unwanted signal voltages. My illustrated embodiment also provides for input and output polarities of the same phase relationship.

The features of my invention which I consider are set forth with particularity in the appended claim. The invention itself, however, both as to its organization and its method of operation, will be best understood from the following description of a preferred embodiment, when read in connection with the accompanying drawings wherein like reference characters designate similar parts throughout and in which:

Figure 1:
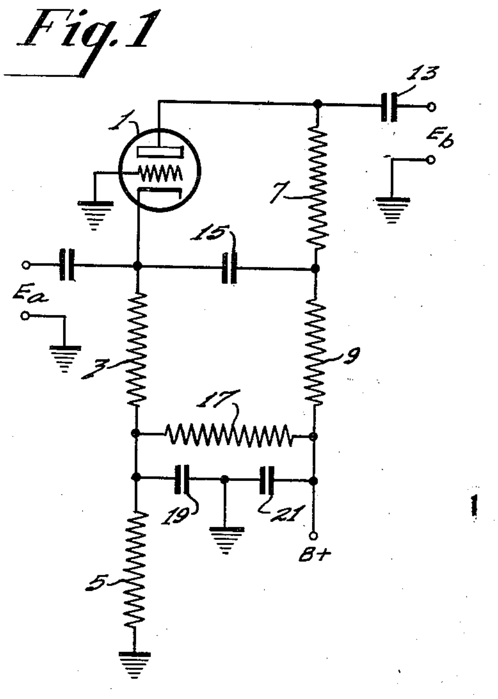
Figure 1 is a schematic representation of an embodiment of my selector stage.

Referring more specifically to Figure 1, there is shown an electron tube 1 having a grounded grid, a cathode impedance consisting of two resistors 3 and 5 connected to ground, and an output impedance consisting of two resistors 7 and 9 connected to B+. Input voltage $E_a$ is inserted through a capacitor 11 directly to the cathode and output voltage is taken directly from the plate through a capacitor 13. One side of both the input and output voltage is grounded, ground herein being used to denote the voltage reference level. A capacitor 15 is connected from the junction of the anode resistors to the cathode. From the junction of the cathode resistors a resistor 17 is connected to the B+ anode voltage supply, across which resistor two capacitors 19 and 21 are connected in series. The common connection between capacitors 19 and 21 is grounded.

Figure 2:
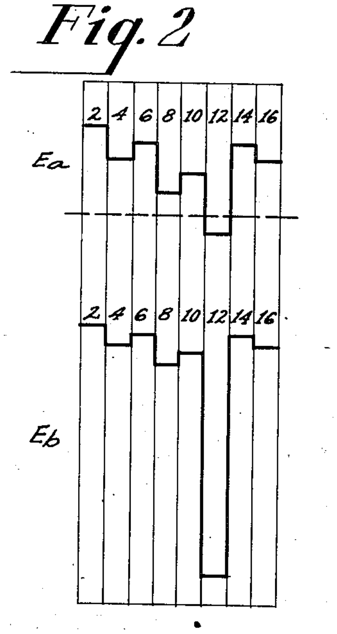
Figure 2 shows the relative amplitudes of typical input and output voltages in a selector stage.

In Figure 2, a typical input voltage waveform is shown $E_a$, and its corresponding output waveform, $E_b$, as taken from a selector stage as shown in Figure 1.

Figure 3:
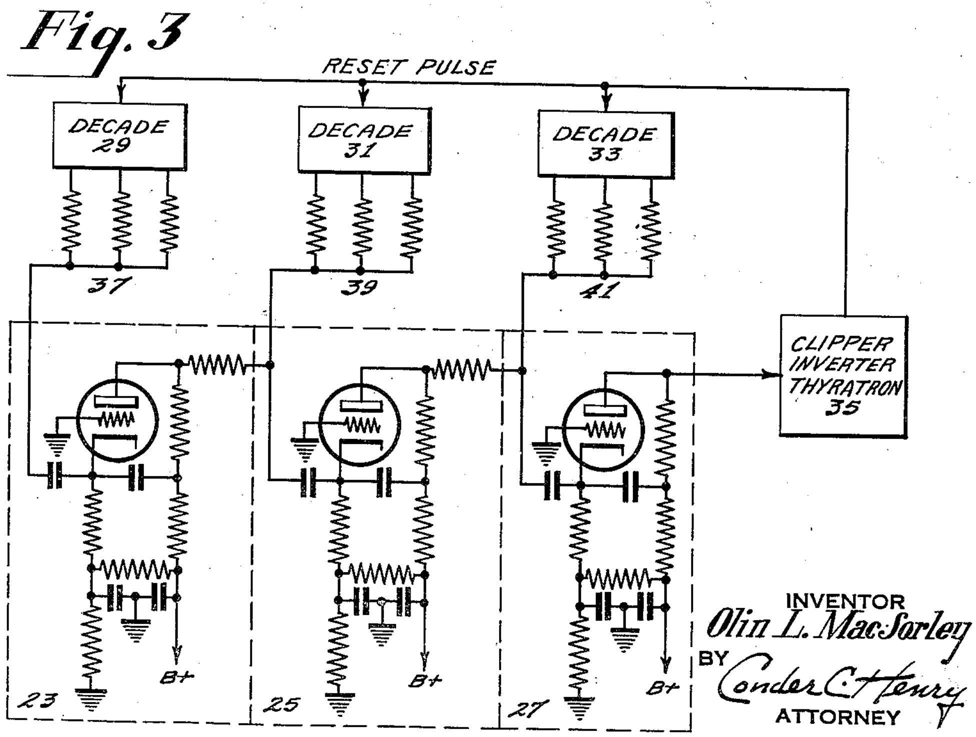
Figure 3 represents a circuit comprising a three decade divider system in which my selector stages are used.

Figure 3 shows a three decade divider system similar to that described in my copending application Ser. No. 749,849, filed May 23, 1947. In this figure cascade decades 29, 31 and 33 have connections going through channel resistors 37, 39 and 41 to the input of corresponding selector stages 23, 25, and 27, such as shown in Figure 1, which are connected in cascade. The output from the last selector stage 27 is connected to a clipper, inverter, thyratron stage 35 from which connections are made to all of the decades.

The following description of operation will be based on the above figures. Assume a varying voltage as shown in Figure 2, applied at the terminals $E_a$ in Figure 1. This input voltage will cause the tube to conduct only when negative enough to overcome any grid bias. We can then assume that the cathode resistors 3 and 5 are proportioned so that current flows only during the variation 12 in Figure 2. It is to be understood that the ratios of resistors 17 and 5 also will affect the cutoff point by changing the grid bias on the tube.

This current flow will cause a voltage drop across the output impedance resistors 7 and 9 which will cause the signal plate voltage to go negative with respect to ground, due to the coupling capacitor 13. The A. C. voltage change across resistor 9 will appear through the regenerative feedback capacitor 15 across the cathode resistor 3, where it will add in the same phase to $E_a$, thus producing a greater change in plate current providing a large amplification illustrated by the corresponding output variations 12 in $E_b$. Both the input and output voltages are of the same phase relationship in this embodiment.

If voltage variation 14 occurs in $E_a$, the positive change in $E_a$ produces a decrease in plate current, which produces a decrease in voltage across the resistor 9, which change appears across resistor 3 to add to the change of $E_a$ and hasten the cutting off of plate current. In this manner a square wave input signal may be amplified with little distortion. It is to be understood, however, that my invention is not to be limited to square wave input voltages.

When the output signal is taken from the anode to ground, the original signal somewhat attenuated appears at the output terminals during the time the tube is cut off. The relative amplitudes of the respective pulses however have such a large ratio that such change may be neglected in all ordinary applications of such a circuit.

The voltage amplitude to be selected may readily be predetermined and set by choosing the proper resistors 17 and 5. Obviously, any other type of bias voltage might be used and does not need to be the D. C. voltage drop across the resistor-capacitor combination 5 and 19 as shown in Figure 1.

As hereinbefore described, the main advantages of this circuit are that the desired signal is amplified without reversal of phase and that the amplification is greatly increased by use of the regenerative feedback. Possibility for degeneration is also decreased in this embodiment by grounding the grid.

As an application of my selector stage, Figure 3 shows a three decade divider system which is commonly known in the art. However, it is not to be limited to such a use and has utility whenever signal selection and amplification is needed.

Input voltage of the first cascaded selector-amplifier stage, shown in the block 23, is taken from the first cascaded decade, or binary group 29, through the resistors 37. Input voltages to the subsequent selector stages 25 and 27 are taken from the corresponding decades 31 and 33 in like manner. At the output of the last selector stage a thyratron circuit 35 or similar clipper-inverter stage is used to provide a reset pulse, which is inserted into each of the cascaded decades.

When the voltage input to any selector stage becomes greater than the predetermined operating voltage for that stage, the resulting operation will produce an output voltage which is mixed at the succeeding stage with the decade voltage. In such manner the input signal may be divided, as desired, by selection of proper decade values. Upon completion of the complete cycle a pulse is derived from the output voltage of the last selector-stage 27 which is used to reset the decade system.

In describing herein an embodiment which is briefly a regenerative, grounded grid, selective amplifying circuit, it will be understood that there may be suggested to those skilled in the art certain modifications which will not constitute a departure from the spirit of my invention.

Having thus fully described the nature, construction and operation of my invention, I wish to secure by Letters Patent and claim:

A regenerative signal amplifier for selectively amplifying signal voltages of less than a predetermined amplitude comprising, in combination, an electron tube having an anode, a cathode and a control grid, said control grid being connected to a point of reference potential, a signal input circuit coupled directly between said control grid and said cathode, an output circuit coupled directly between said anode and said point of reference potential, cathode resistor means connected between said cathode and said point of reference potential, a source of direct-current energizing means having positive and negative terminals, said negative terminal being connected to said point of reference potential, bias determining means for effecting selective amplification of voltages less than said predetermined amplitude including a fractional part of said cathode resistor means connected between said positive and negative terminals, output resistive means connected between said anode and said positive terminal, capacitive regenerative feedback means connected between said cathode and an intermediate point on said output resistive means, a second capacitive means shunting said fractional part of said cathode resistor means, and a third capacitive means connected between said positive and negative terminals.

OLIN L. MACSORLEY.

REFERENCES CITED

The following references are of record in the file of this patent:

UNITED STATES PATENTS

| Number | Name | Date |
|---|---|---|
| 2,276,565 | Crosby | Mar. 17, 1942 |
| 2,282,381 | Root | May 12, 1942 |
| 2,289,301 | Barber | July 7, 1942 |
| 2,298,629 | Schaper | Oct. 13, 1942 |
| 2,354,483 | Schock | July 25, 1944 |

OTHER REFERENCES

Terman, "Radio Engineering," 2nd edition, 1937, McGraw-Hill Book Company (p. 468, Fig. 259*d*). (Copy in Div. 51.)